United States Patent [19]
Shigemori

[11] Patent Number: 6,125,089
[45] Date of Patent: Sep. 26, 2000

[54] RECORDING TIMING CONTROL CIRCUIT FOR OPTICAL DISK DRIVING DEVICE

[75] Inventor: Toshihiro Shigemori, Kanagawa, Japan

[73] Assignee: Ricoh Company, Ltd., Tokyo, Japan

[21] Appl. No.: 09/056,843

[22] Filed: Apr. 8, 1998

[30] Foreign Application Priority Data

Apr. 9, 1997  [JP]  Japan .................................... 9-105357

[51] Int. Cl.⁷ ....................................................... G11B 5/09
[52] U.S. Cl. ............................................. 369/47; 369/50
[58] Field of Search ........................................ 369/47, 48

[56] References Cited

U.S. PATENT DOCUMENTS

| 5,335,215 | 8/1994 | Yoshiyama ................................. 369/50 |
| 5,553,042 | 9/1996 | Usui ....................................... 369/47 X |
| 5,737,289 | 4/1998 | Udaagawa .................................. 369/54 |

FOREIGN PATENT DOCUMENTS 2-3137  of 1990  Japan .
2-50363  of 1990  Japan .
6-290462  of 1994  Japan .

*Primary Examiner*—Aristotelis M. Psitos
*Attorney, Agent, or Firm*—Dickstein Shapiro Morin & Oshinsky LLP

[57] ABSTRACT

An ATIP decoder detects an ATIP synchronization signal from a wobble signal which was recorded on an optical disk as a wobble of pregrooves formed on the optical disk. A CD encoder performs EFM modulation on information to be recorded, inserting a subcode frame synchronization signal into the information to be recorded at a predetermined position, and outputting an EFM pattern to be recorded. The CD encoder includes an EFM outputting timing control circuit which controls a timing at which the EFM pattern is output. The EFM outputting timing control circuit performs information recording timing initialization, before the EFM pattern is actually recorded on the optical disk, in which initialization the phase between a timing at which the ATIP synchronization signal is detected from the optical disk and a timing at which the subcode frame synchronization signal is recorded on the optical disk is adjustable.

5 Claims, 9 Drawing Sheets

FIG. 1

| DATA | SYNC | MINUTES | SECONDS | FRAMES | CRC REMAINDER |
|---|---|---|---|---|---|
| NUMBER OF BITS | 4 | 8 | 8 | 8 | 14 |

RECORDING TIMING CONTROL CIRCUIT FOR OPTICAL DISK DRIVING DEVICE

BACKGROUND OF THE INVENTION

1. Field of the Invention

The present invention relates to an optical disk driving device for driving a CD-R, on which data can be recorded, a CD-RW, on which data can be rewritten, and, in particular, to a recording timing control circuit for such an optical disk driving device.

2. Description of the Related Art

As a type of compact disk, a CD-R (CD recordable: recording can be performed only once), a CD-RW (CD rewritable: recording can be performed a plurality of times), and a CD-E (also called a CD erasable) are known.

On these CD-R and CD-RW disks (hereinafter, referred to as CD-R/RW), pregrooves are formed as guide tracks for information recording.

The pregroove wobbles right and left in the shape of a sine curve with a center frequency of 22.05 kHz.

Further, the pregroove is obtained as a result of FM modulation being performed with a modulation factor of +/−1 kHz from the center frequency of 22.05 kHz corresponding to a time code which indicates time information for each sector.

Accordingly, by performing FM demodulation on the wobbling frequency, a time code indicating the time information can be obtained.

The time information recorded as a wobbling signal of the pregroove is called ATIP (Absolute Time In Pregroove).

The ATIP includes not only the time information but also an ATIP synchronization signal and a CRC code.

A format of an ATIP frame will now be described.

As shown in FIG. 1, The ATIP frame includes the synchronization signal (Sync), minutes, seconds, frames and the CRC code (CRC remainder). The data of minutes, seconds and frames is also called MSF (Minutes, Seconds, Frame) data.

The ATIP synchronization signal has a pattern such as that shown in FIG. 2.

FIG. 2 shows one example for the ATIP synchronization signal.

The pattern of the ATIP synchronization signal (SYNC) is '11101000', as shown in FIG. 2, as channel bits, when the immediately prior cell=0, and the synchronization signal has the signal waveform (pattern) as shown in FIG. 2. When the immediately prior cell=1, the pattern of the ATIP synchronization signal is the pattern of '00010111' as channel bits.

In a driving device (hereinafter, referred to as a CD-R/RW drive) which can record information on the CD-R/RW, the ATIP is detected, the time information of the current sector is detected and the sector from which information is to be recorded is determined.

Information later recorded on the CD-R/RW has a format the same as the format of a CD (Compact Disk).

On the CD, a subcode frame synchronization signal is recorded in information later recorded.

A position relationship between the ATIP synchronization signal included in the pregroove of the CD-R/RW and the subcode frame synchronization signal included in information later recorded will now be described.

In part 2 of the Orange Book which is known as a book of standards for the CD-R, it is prescribed that the position displacement between the ATIP synchronization signal and the subcode frame synchronization signal included in information later recorded is to be within a predetermined value.

FIG. 3 shows a position relationship between the ATIP synchronization signal included in the pregroove of the CD-R/RW and the subcode frame synchronization signal included in information later recorded.

As shown in FIG. 3, the position displacement between the ATIP synchronization signal (ATIP SYNC) and the subcode frame synchronization signal (SUBCODE SYNC) is to be within the predetermined value.

When the position displacement between the two synchronization signals becomes larger, in a case where information is recorded on a not-yet-recorded area subsequent to an already-recorded area on a disk, overlapping of two pieces of recorded information may occur, the overlapped portion may be large, and thereby, reproduction may be impossible. Conversely, when a space between adjacent pieces of recorded information is large, synchronization detection cannot be performed and, similarly, reproduction is impossible.

FIG. 4 shows a general functional block diagram of a portion of an example of a recording timing-control circuit in a CD-R/RW drive in the related art. This portion includes an EFM encoder 41 and an ATIP decoder 42. In FIG. 4, EFM is a pattern to be recorded, SUBSYNC is a subcode frame synchronization signal insertion timing signal, EXTSYNC is a synchronization request signal, EXTACK is a synchronization completion signal, ATIPSYNC is an ATIP synchronization detection signal, BICLKIN is a biphase clock signal and BIDATAIN is biphase data.

The biphase data BIDATAIN and the biphase clock signal BICLKIN are input to the ATIP decoder 42. The biphase data BIDATAIN is obtained as a result of FM demodulation being performed on the wobbling signal of the pregroove by an external FM demodulating circuit. The biphase clock signal BICLKIN is extracted from the biphase data BIDATAIN by an external clock extracting circuit.

The ATIP decoder 42 detects the time information of the ATIP and detects the ATIP synchronization signal from the biphase data BIDATAIN and biphase clock signal BICLKIN.

When the ATIP synchronization signal is detected, the ATIP synchronization detection signal ATIPSYNC is output.

The EFM encoder 41 modulates data to be recorded so as to cause the data to have a predetermined CD format, and outputs the pattern to be recorded (EFM).

Further, the EFM encoder 41 inserts the subcode frame synchronization signal into the pattern to be recorded (EFM).

In this case, at the timing at which the subcode frame synchronization signal is inserted, the EFM encoder 41 outputs the subcode frame synchronization insertion timing signal SUBSYNC.

Timing initialization of the EFM encoder 41, which is performed prior to recording information will now be described.

FIG. 5 shows a timing chart for illustrating operations of the timing initialization of the EFM encoder 41. The reference symbols given to the respective waveforms correspond to the reference symbols shown in FIG. 4, respectively.

In the CD-R/RW drive, before information recording is started, the synchronization request signal EXTSYNC is input to the EFM encoder 41, in order to perform initialization so that the position displacement between the ATIP synchronization signal (ATIP SYNC) and the subcode frame synchronization signal (SUBCODE SYNC) is to be within a predetermined range. In FIG. 5, the sign '-' is given to the synchronization request signal EXTSYNC. This sign '-' means that the period during which the synchronization request signal is generated is the period during which the waveform is at a low level.

When the synchronization request signal EXTSYNC is input, the EFM encoder 41 outputs the subcode frame synchronization signal insertion timing signal SUBSYNC so that the subcode frame synchronization signal should be inserted immediately after the detection of the ATIP synchronization signal, for example, within 1 EFM frame from the output of the ATIP synchronization detection signal ATIPSYNC.

Thus, the timing initialization of the EFM encoder 41 is performed.

When the timing initialization is performed, the EFM encoder 41 outputs the synchronization completion signal EXTACK.

The recording timing control circuit shown in FIG. 4 operates as described above, and, the timing from the detection of the ATIP synchronization signal to the insertion of the subcode frame synchronization signal is fixed.

The prior art relating to an optical disk driving device according to the present invention will now be described.

First, as the prior art, a circuit which detects accompanying information, such as that described above, from the wobbling of the pregroove on CD-R is known (for example, Japanese Laid-Open Patent Application No.6-290462).

This circuit for detecting accompanying information is well-known.

Then, a phase synchronization circuit, a so-called digital PLL, used in a digital system, such as digital audio equipment and so forth, is conventionally known (for example, Japanese Laid-Open Patent Application No.2-3137).

This phase synchronization circuit (digital PLL) includes a phase comparator, a digital integrator and a variable frequency divider.

The phase comparator performs phase comparison between an input signal and a reproduced clock signal from the PLL. The thus-obtained phase error signal is integrated by the digital integrator. In accordance with the thus-obtained integrated value, the frequency dividing ratio of the variable frequency divider is determined.

Hereinafter, such a digital PLL is referred to as first prior art.

Further, as related art, as a digital filter, an FIR (Finite Impulse Response) filter is known (for example, Japanese Laid-Open Patent Application No.2-50363).

This FIR filter includes an m-bit parallel delay element, multiplier and accumulator used in a filtering operation.

The delay element latches data at a rising edge of a data latch signal.

The operation result of n bits is output from the accumulator which adds the outputs of the multiplier.

Hereinafter, such a FIR filter is referred to as a second prior art.

As related art described above, a timing from detection of the ATIP synchronization signal to insertion of the subcode frame synchronization signal is fixed.

Accordingly, when the timing of detecting the ATIP synchronization signal is delayed from a timing corresponding to the position of the actual ATIP synchronization signal recorded on the disk, due to delay of biphase data output in the FM demodulating circuit and delay of detection of the ATIP synchronization signal in the ATIP decoder, the timing of inserting the subcode frame synchronization signal is delayed and the insertion position of the subcode frame synchronization signal is displaced. As a result, the position relationship shown in FIG. 3 cannot be maintained.

Therefore, as described above, in a case where information is recorded on a not-yet-recorded area subsequent to an already-recorded area, an overlapped portion may be large, and thereby, reproduction may be impossible. Conversely, when a space between a pair of adjacent pieces of recorded information is large, synchronization detection cannot be performed and, similarly, reproduction is impossible.

SUMMARY OF THE INVENTION

An object of the present invention is to improve reliability of the ATIP time information and to prevent a situation in which reproduction of recorded information is impossible, by eliminating position displacement between the ATIP synchronization signal included in the pregroove on the CD-R/RW and the subcode frame synchronization signal included in information later recorded.

Another object of the present invention is to improve reliability of the ATIP time information by reducing occurrences of ATIP decode error, by generating the biphase clock signal having a small stationary phase difference with respect to the biphase data even in a case where the center frequency of the wobble signal varies due to variation of speed of disk rotation and/or eccentricity.

A recording timing control circuit of an optical disk driving device, according to the present invention comprises:

a pregroove information detecting means for detecting a first synchronization signal from an input wobble signal which was recorded on an optical disk as wobbling of pregrooves formed on the optical disk; and encoding means for modulating information to be recorded, inserting a second synchronization signal into the information to be recorded at a predetermined position, and outputting a pattern to be recorded, wherein:

the encoding means comprises information outputting timing control means for controlling a timing at which the information-to be recorded is output; and the information outputting timing control means performs information recording timing initialization, before the information to be recorded is actually recorded on the optical disk, in which initialization the phase between a timing at which the first synchronization signal is detected from the disk and a timing at which the second synchronization is recorded on the optical disk is adjustable.

In this arrangement, by appropriately setting an ATIP delay set value (ATIP delay) in accordance with the time delay of outputting biphase data in an FM demodulating circuit and the time delay of detecting the ATIP synchronization signal (first synchronization signal) in the ATIP decoder (pregroove information detecting means), it is possible to adjust the phase used when initialization of the EFM outputting timing (information outputting timing) is performed.

Thereby, it is possible that the position of each of the subcode frame synchronization signals (second synchronization signal) on the disk is approximately coincident with the end of a respective one of the ATIP synchronization signals (first synchronization signal) actually recorded on the disk.

Thus, it is possible to prevent position displacement between each of the positions of the ATIP synchronization signals included in the pregrooves of the CD-R/RW and a respective one of the positions of the subcode frame synchronization signals included in information later recorded.

Thereby, even in a case where information is recorded on a not-yet-recorded area subsequent to an already-recorded area, a situation in which an overlapped portion is large and thereby reproduction is impossible can be prevented. Conversely, even when a space between a pair of adjacent pieces of recorded information is large, a situation in which synchronization detection cannot be performed and thereby reproduction is impossible can be prevented.

A recording timing control circuit of an optical disk driving device, according to the present invention, comprises:

pregroove information detecting means for detecting a first synchronization signal from pregroove information which was recorded on an optical disk as wobbling of pregrooves formed on the optical disk; and encoding means for modulating information to be recorded, inserting a second-synchronization signal into the information to be recorded at a predetermined position, and outputting a pattern to be recorded, wherein the pregroove information detecting means comprises:

a first digital PLL circuit which causes the phase of an operating clock signal thereof to be locked to the phase of the wobble signal, and outputs a demodulated signal of the frequency component of the wobble signal and a clock signal having a frequency obtained from multiplying the frequency of the wobble signal;

a digital filter which operates using the multiplied clock signal output from the first digital PLL circuit as a sampling clock, and removes a high-frequency noise component from the demodulated signal output from the first digital PLL circuit;

a second digital PLL circuit which uses the multiplied clock signal output from the first digital PLL circuit as an operating clock signal thereof and outputs a demodulated clock signal, the phase of which is locked to the phase of the demodulated signal output from the digital filter; and a synchronization detecting circuit which operates using the demodulated clock signal output from the second digital PLL circuit as a sampling clock signal, and detecting a synchronization signal of the wobble signal from the signal output from the digital filter.

In this arrangement, the digital filter performs sampling using the first multiplied clock signal. Thereby, when the center frequency of the wobble signal varies, the cut-off frequency of the digital filter varies in proportion to the variation of the center frequency of the wobble signal.

As a result, when the center frequency of the wobble signal varies due to variation of speed of disk rotation and/or eccentricity, the cut-off frequency of the digital filter is always adjusted to be optimum.

The ATIP-PLL (second PLL circuit) uses the multiplied clock signal as the operating clock signal.

Thereby, when the center frequency of the wobble signal varies, the free-running frequency of the ATIP-PLL varies in proportion to the variation of the center frequency of the wobble signal.

As a result, when the center frequency of the wobble signal varies due to variation of speed of disk rotation and/or eccentricity, it is possible that the biphase clock signal having a small stationary phase difference with respect to the biphase data can be generated.

Other objects and further features of the present invention will become more apparent from the following detailed description when read in conjunction with the accompanying drawings.

BRIEF DESCRIPTION OF THE DRAWINGS

FIG. 1 shows an example of a frame arrangement of a format of an ATIP frame;

DETAILED DESCRIPTIONS OF THE PREFERRED EMBODIMENTS

A first embodiment of the present invention has features that the phase used when the EFM output timing is initialized is adjustable, by setting an ATIP delay set value to a suitable value, in accordance with the delay time of biphase data output in the FM demodulating circuit and the delay time of detection of the ATIP synchronization signal in the ATIP decoder.

Figure 6:
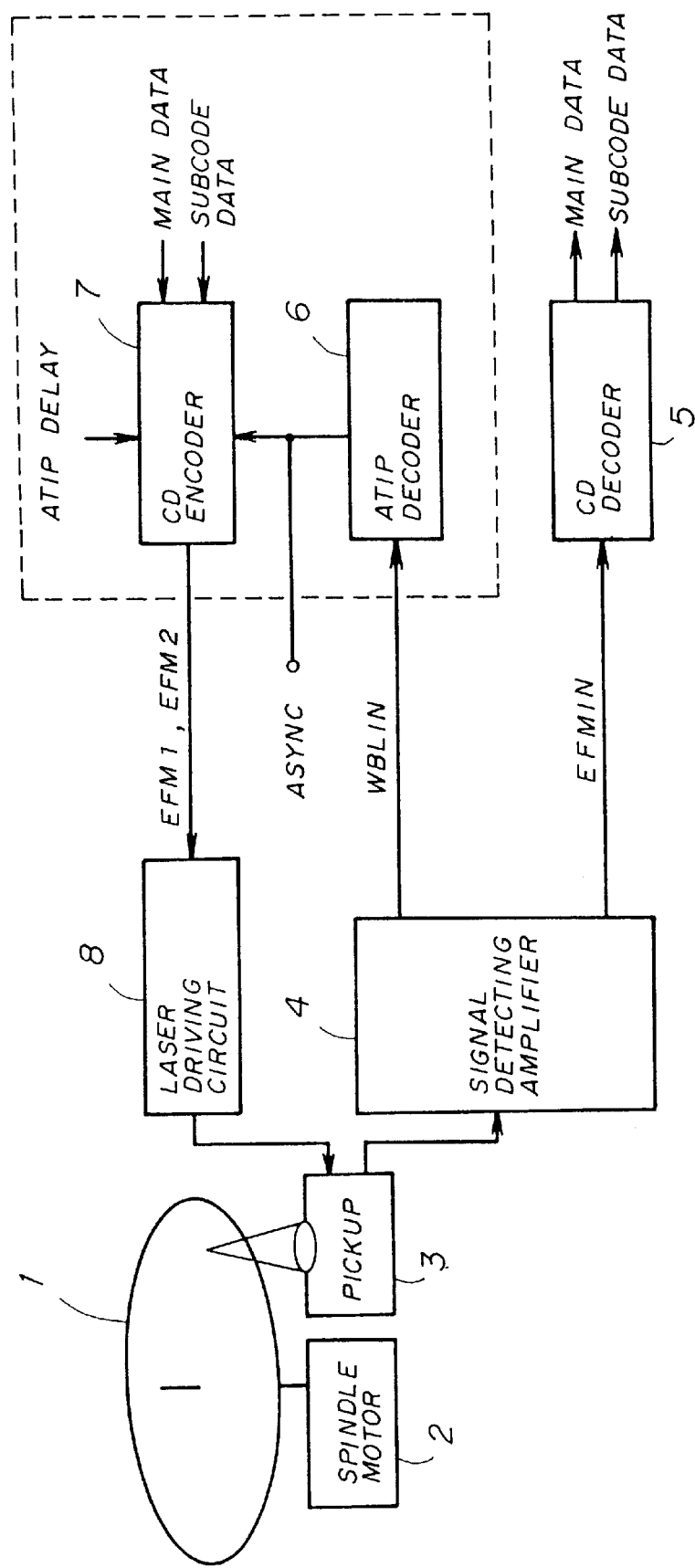
FIG. 6 shows a general functional block diagram showing one example of a first embodiment in an optical disk driving device of the present invention.

FIG. 6 shows a general functional block diagram of one example of the first embodiment in an optical disk driving device of the present invention. In the figure, a disk 1, a spindle motor 2, a pickup 3, a signal detecting amplifier 4, a CD decoder 5, an ATIP decoder 6, a CD encoder 7 and a laser driving circuit 8 are shown. A reproduced signal EFMIN is input to the CD decoder 5 and a wobble signal WBLIN is input to the ATIP decoder 6. ASYNC is an ATIP synchronization detection signal, EFM1 and EFM2 are patterns to be recorded, and ATIP delay is an ATIP delay set value.

On the disk 1 shown in FIG. 6, as described above for the CD-R/RW, the ATIP having a format such as that shown in FIG. 1 has been recorded as the wobbling of the pregrooves.

Similar to the related art, the spindle motor 2 supports and rotates the disk 1, the pickup 3 irradiates the disk 1 by a laser beam and receives the light reflected by the disk 1, and a movement control system (not shown in the figure) moves the pickup 3.

The pickup 3 irradiates a track on the disk 1 by a laser beam and records information thereto and reproduces information therefrom.

When recording information-on the disk 1, the laser driving circuit 8 drives the laser of the pickup 3 with recording power in accordance with a signal to be recorded that is output from the CD encoder 7.

When reproducing information from the disk 1, the laser driving circuit 8 drives the laser with reproducing power.

At the time of reproduction, the signal amplifier 4 amplifies a reflected light signal detected by the pickup 3 from the disk 1, and outputs a signal (reproduced signal EFMIN) obtained as a result of reproducing the information recorded on the disk and a signal (wobble signal WBLIN) obtained as a result of detecting the wobbling of the pregrooves on the disk 1.

The reproduced signal (EMFIN) is input to the CD decoder 5 and is output as main data and subcode data.

The wobble signal (WBLIN) is input to the ATIP decoder 6.

Figure 2:
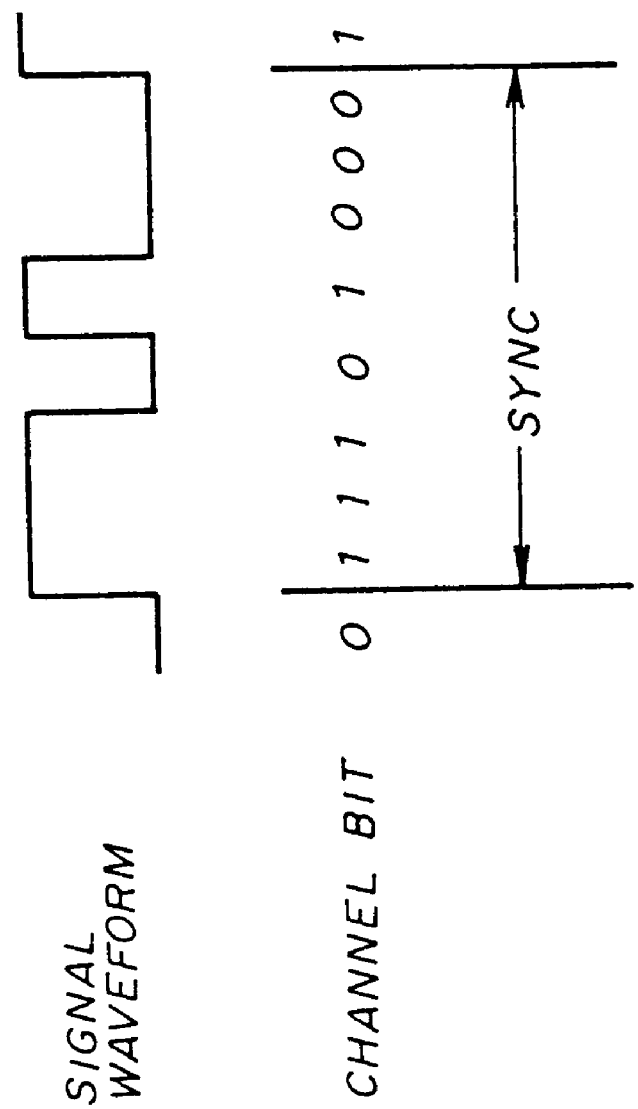
FIG. 2 shows an example of a pattern of an ATIP synchronization signal.
Figure 3:
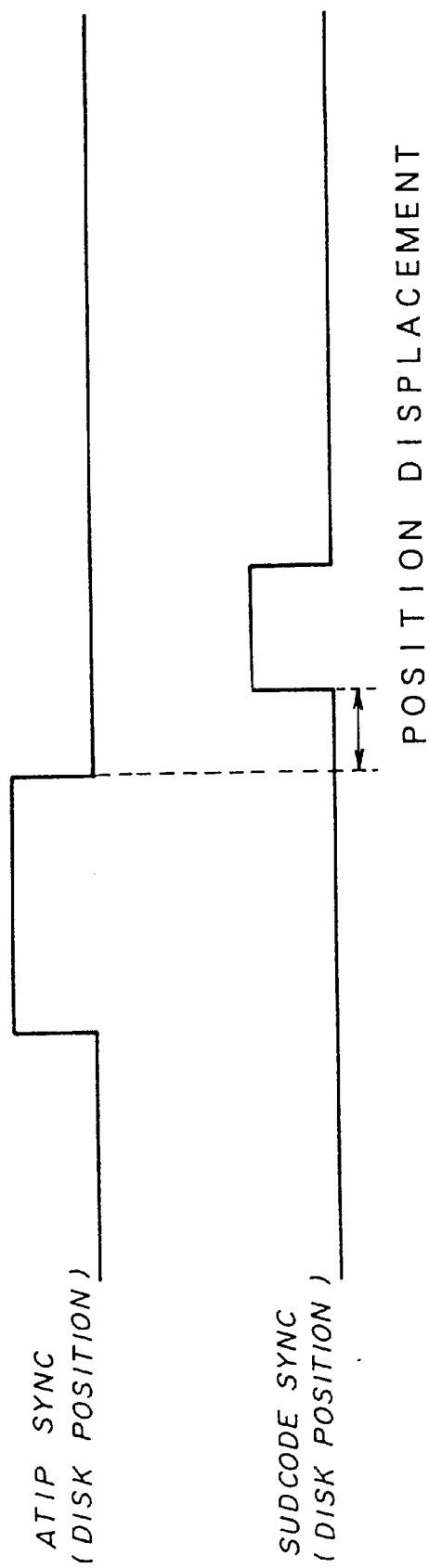
FIG. 3 shows a position relationship between the ATIP synchronization signal included in a pregroove of a CD-R/RW and a subcode frame synchronization signal included in information later recorded.
Figure 4:
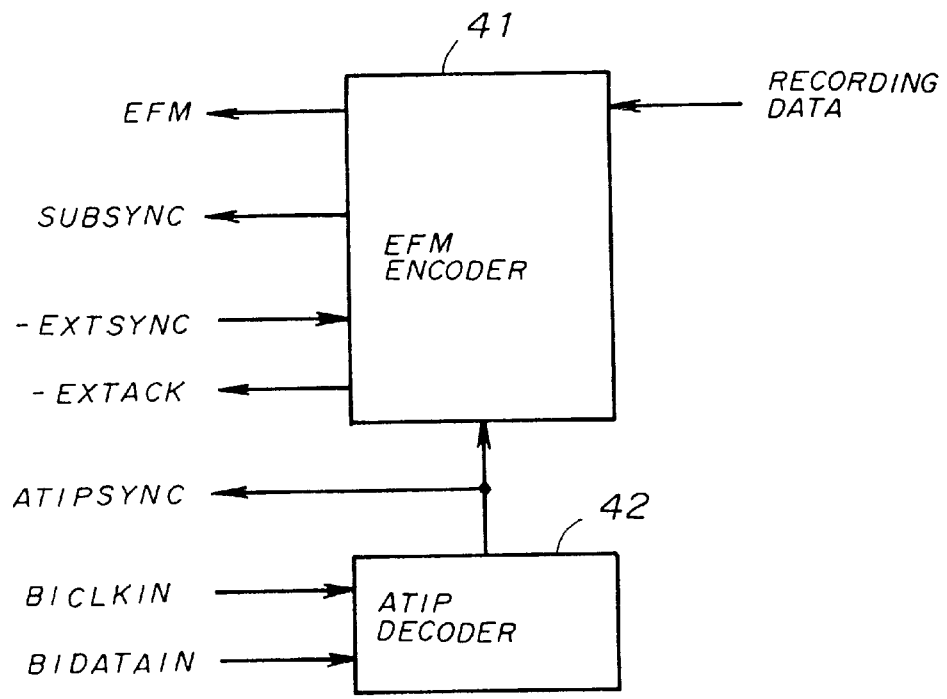
FIG. 4 shows a general functional block diagram of a portion of an example of a recording timing control circuit in a CD-R/RW drive in the related art.
Figure 5:
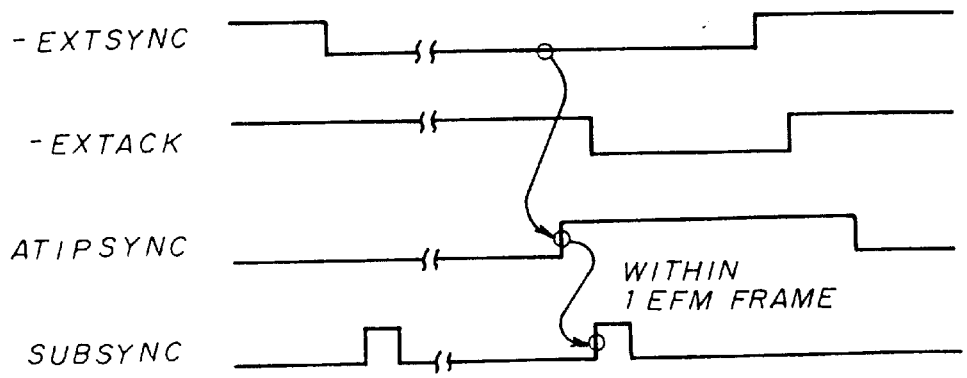
FIG. 5 shows a timing chart for illustrating operations of timing initialization of an EFM encoder shown in FIG. 4.

In the ATIP decoder 6, FM demodulation is performed on the wobble signal WBLIN, detects the biphase data (corresponding to BIDATAIN shown in FIG. 4), and extracts the biphase clock signal (corresponding to BICLKIN shown in FIG. 4) from the biphase data.

The time information and the ATIP synchronization signal of the ATIP are detected from the biphase data and biphase clock signal.

When detecting the ATIP synchronization signal, the ATIP decoder outputs the ATIP synchronization detection signal ASYNC.

At the time of recording, the CD encoder 7 modulates main data and subcode data of input data to be recorded so as to cause the main data and subcode data to have predetermined CD formats, generates the patterns EFM1 and EFM2 to be recorded, and outputs these patterns to the laser driving circuit 8.

The CD encoder 7 will now be described in detail.

Figure 7:
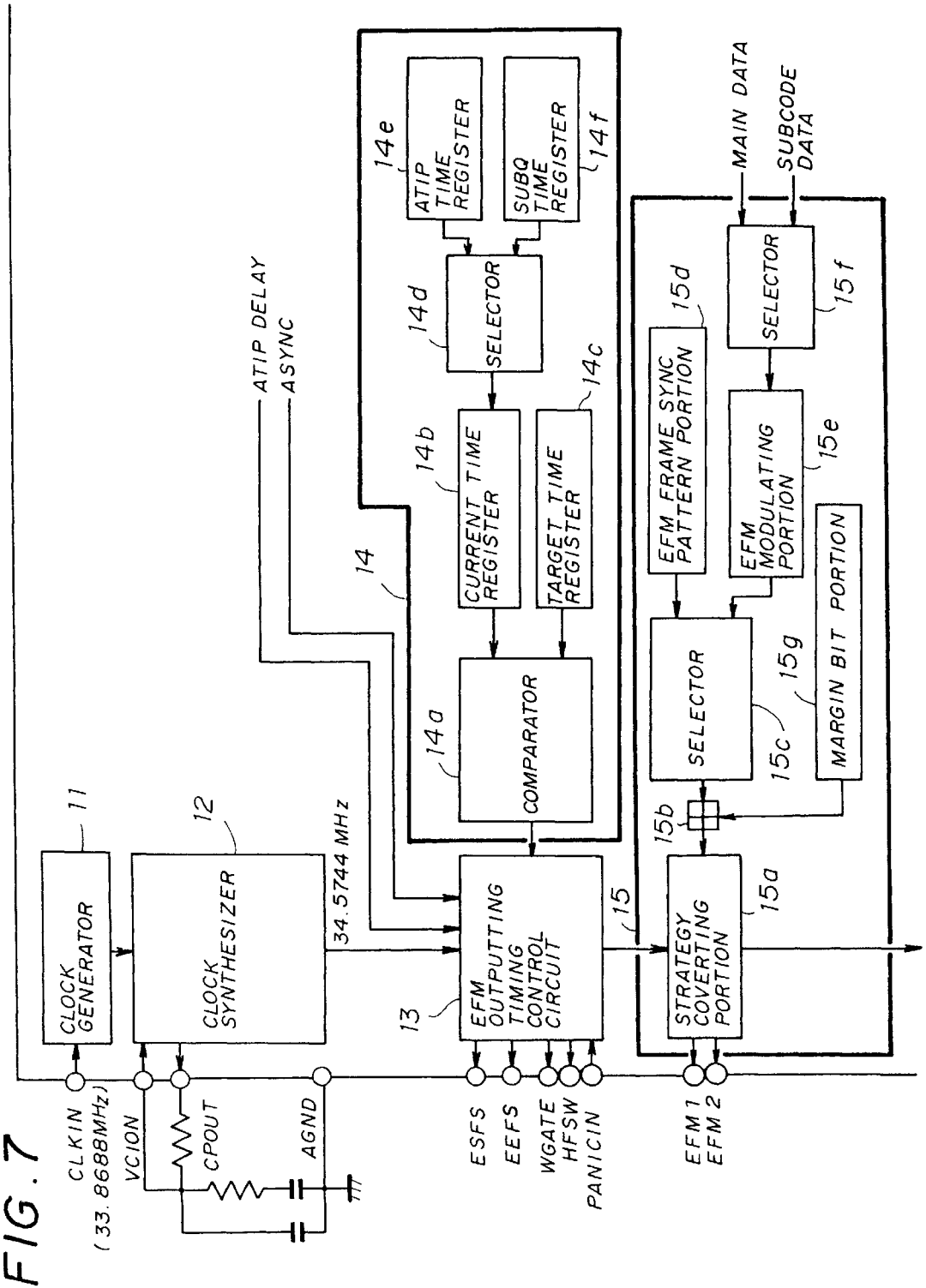
FIG. 7 shows a general functional block diagram showing of a portion of an example of a CD encoder shown in FIG. 6.

FIG. 7 shows a general functional block diagram of a portion of an example of the CD encoder 7 shown in FIG. 6. In FIG. 7, a clock generator 11, a clock synthesizer 12, an EFM outputting timing control circuit 13, an encoding starting control circuit 14, which includes a comparator 14a, a current time register 14b, a target time register 14c, a selector 14d, an ATIP time register 14e and a subQ time register 14f, an EFM encoder 15, which includes a strategy converter 15a, an adder 15b, a selector 15c, an EFM frame sync pattern portion 15d, an EFM modulating portion 15e, a selector 15f, and a margin bit portion 15g, are shown.

A clock signal for encoding (encoding clock signal) is generated by the clock generator 11 and the clock synthesizer 12.

The encoding starting control circuit 14 detects a recording starting position from the information of the ATIP time detected by the ATIP decoder 6 and held in the ATIP time register 14e and the time information indicating the information recording starting target time held in the target time register 14c.

The information recording starting target time and the current time selected by the selector 14d are input to the comparator 14a.

The comparator 14a compares the information recording starting target time with the current time. When these times coincide with one another, the comparator 14a outputs a coincidence signal to the EFM outputting timing control circuit 13.

When receiving the coincidence signal, the EFM outputting timing control circuit 13 outputs a recording starting signal to the EFM encoder 15.

The EFM encoder 15 performs EFM modulation on the main data and subcode data to be recorded and outputs the patterns EFM 1 and EFM 2 to be recorded.

In this case, insertion of an EFM frame synchronization signal and a subcode frame synchronization signal (S0, S1) is performed at the timings controlled by the EFM outputting timing control circuit 13.

Before the information recording starting target time, the EFM outputting timing control circuit 13 initializes the EFM output timing using the ATIP synchronization detection signal ASYNC output from the ATIP decoder 6.

The timing of insertion of the subcode frame synchronization signal after the initialization is variable in accordance with the ATIP delay set value (ATIP delay).

Figure 8:
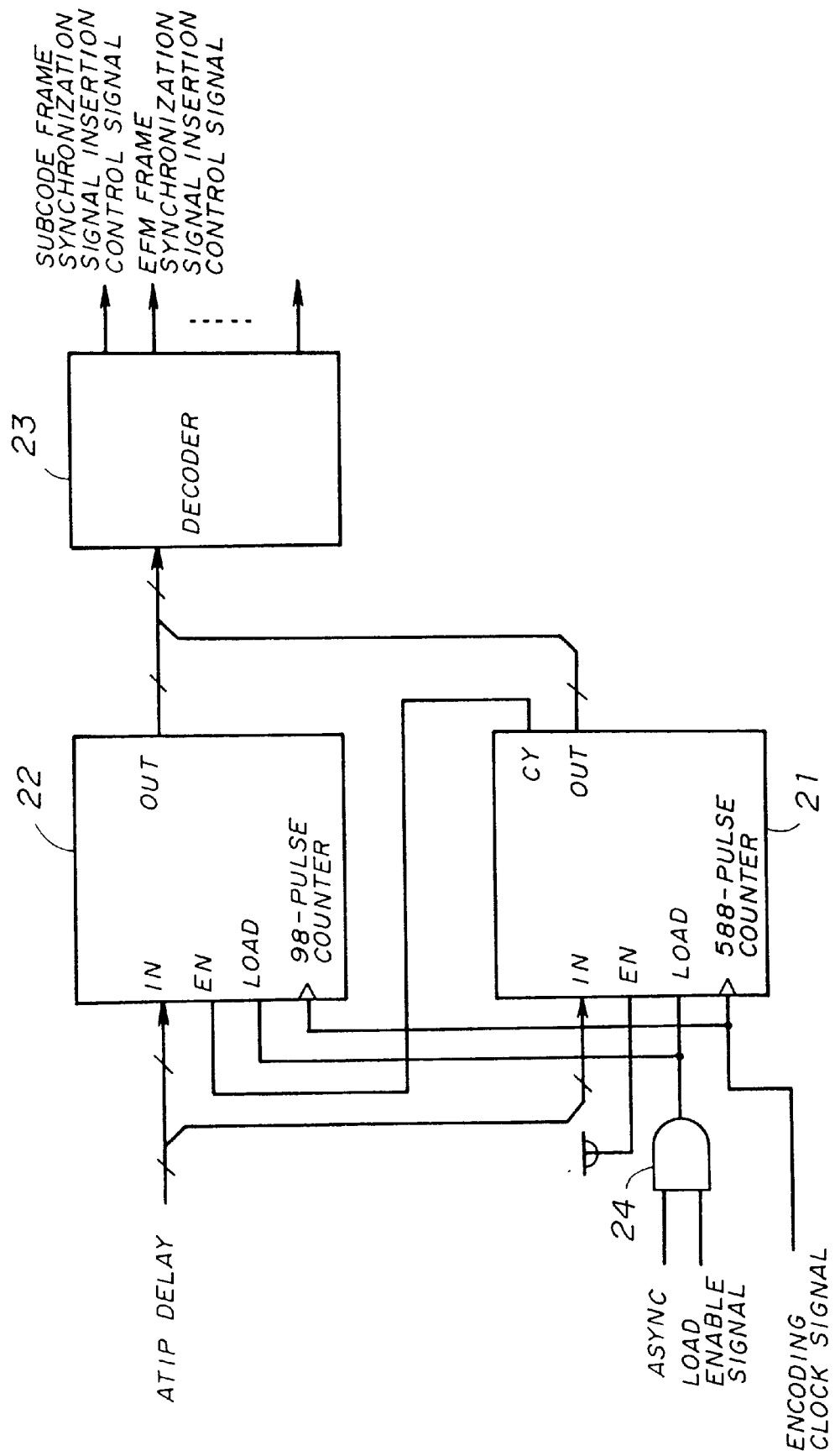
FIG. 8 shows a general functional block diagram of a portion of an example of an EFM outputting timing control circuit shown in FIG. 7.

In summary, in the EFM outputting timing control circuit 13 shown in FIG. 8, at the time of initialization of the EFM output timing, the count value corresponding to the delay time (ATIP delay) is loaded in a 98-pulse counter 22.

The EFM outputting timing control circuit 13 will now be described in detail.

FIG. 8 shows a general functional block diagram of a portion of an example of the EFM outputting timing control circuit 13. In FIG. 8, a 588-pulse counter 21, the 98-pulse counter 22, a decoder 23 and an AND gate 24 are shown.

The 588-pulse counter 21 counts the pulses of the encoding clock signal and the counting period of this counter is 588 pulses.

The period of counting 588 pulses corresponds to the period of one EFM frame.

The 98-pulse counter 22 counts each time when the 588-pulse counter 21 counts 588 pulses, and the counting period of the 98-pulse counter 22 is 98 pulses.

The period of counting 98 pulses corresponds to one subcode frame.

The decoder 23 decodes the count values of the 588-pulse counter 21 and 98-pulse counter 22, and outputs timing signals such as a subcode frame synchronization signal insertion control signal, an EFM frame synchronization signal insertion control signal and so forth.

In the EFM outputting timing control circuit 13 shown in FIG. 8, a load enable signal is enabled before the information recording starting target time, and the ATIP delay set value (ATIP delay) is loaded in the 588-pulse counter 21 and the 98-pulse counter 22 by the ATIP synchronization detection signal ASYNC.

Then, the load enable signal is disabled and the 588-pulse counter 21 and 98-pulse counter 22 perform counting in their periods of counting, respectively.

Figure 9:
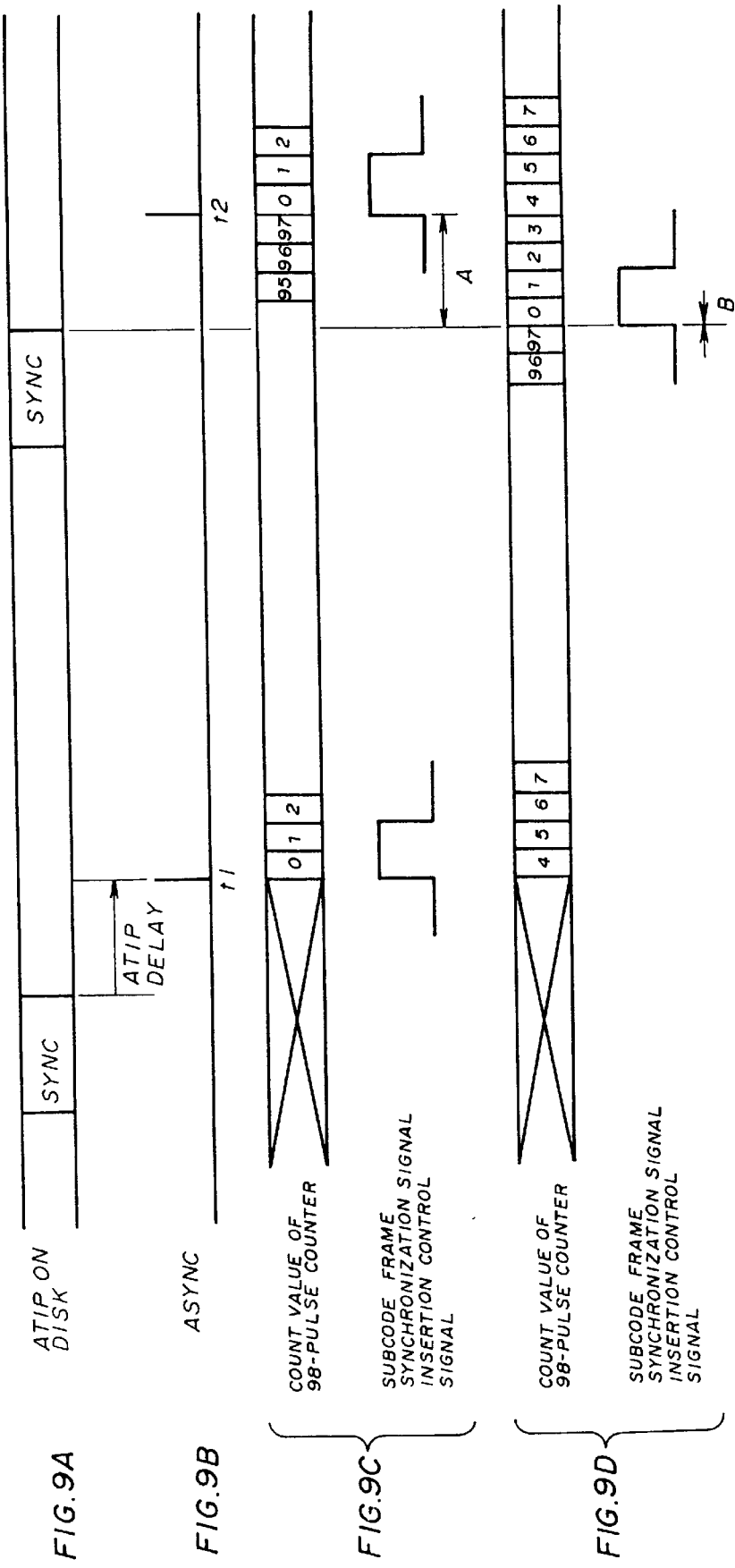
FIGS. 9A, 9B, 9C and 9D show timing charts for illustrating operations when EFM output timing is initialized using a circuit shown in FIG. 8.

FIGS. 9A, 9B, 9C and 9D show timing charts for illustrating operations when the EFM output timing is initialized. FIG. 9A shows the ATIP synchronization signal SYNC recorded on the disk 1. FIG. 9B shows the ATIP synchronization detection signal ASYNC detected by the ATIP decoder 6. FIG. 9C shows the count values of the 98-pulse counter 22 when the value '0' is loaded thereto and the subcode frame synchronization signal insertion control signals. FIG. 9D shows the count values of the 98-pulse counter 22 when the value '4' is loaded thereto and the subcode frame synchronization signal insertion control signal. The symbols 't1' and 't2' in FIG. 9B indicate the output timings of the ATIP synchronization detection signals, respectively.

The symbols 'A' and 'B' in FIGS. 9C and 9D indicate delays of occurrence times of the subcode frame synchronization signal insertion control signals, respectively.

It is assumed that the ATIP synchronization signals SYNC have been recorded on the disk 1 at the positions as shown in FIG. 9A, respectively.

The output timing of the ATIP synchronization detection signals ASYNC from the ATIP decoder 6 delay from the timing corresponding to the positions of the ATIP synchronization signals SYNC on the disk 1, respectively, as shown in FIGS. 9A and 9B, as described above, due to the delay of the time of outputting the biphase data in the FM demodulating circuit and the delay of the time of detecting the ATIP synchronization signals SYNC in the ATIP decoder 6.

For example, as indicated by 't1' and 't2', outputting of the ATIP synchronization detection signals ASYNC are delayed by the time 'ATIP delay', respectively.

At the time of initialization, when the value '0' is loaded in the 98-pulse counter 22, the count value of the 98-pulse counter 22 is '0' at the time 't1', as shown in FIGS. 9B and 9C, at which the ATIP synchronization signal detection signal is output. Thereby, the subcode frame synchronization signal insertion control signal is generated.

This relationship is similar at the time 't2', shown in FIG. 9C, at which the ATIP synchronization detection signal ASYNC is detected, as shown in FIGS. 9A and 9B.

Accordingly, the positions at which the subcode frame synchronization signals are recorded are, as shown in FIG. 9C, shifted by the distances corresponding to the time delay corresponding to the count value '4' with respect to the actual ATIP synchronization signals SYNC on the disk 1, respectively.

When the value '4' is loaded in the 98-pulse counter 22 at the time of initialization, as shown in FIGS. 9B and 9D, at the time at which the ATIP synchronization detection signal is output, the count value of the 98-pulse counter 22 is '4'. As a result, the subcode frame insertion control signal is not generated.

Then, as shown in FIGS. 9A and 9D, the count value of the 98-pulse counter 22 is '0' at the time corresponding to the position of the end of the subsequent ATIP synchronization signal SYNC on the disk 1.

Accordingly, as shown in FIGS. 9A and 9D, the output timing of the subcode frame synchronization signal insertion control signal is generated before the time 't2' at which the ATIP synchronization detection signal ASYNC is output. Further, it is possible that the recording position of the subcode frame synchronization signal on the disk 1 is approximately coincident with the end of the ATIP synchronization signal SYNC actually recorded on the disk 1. Thus, the delay time 'B' corresponding to the distance from the end of the ATIP synchronization signal SYNC and the position at which the subcode frame synchronization signal is recorded is approximately '0'.

In the first embodiment of the present invention, by appropriately setting the ATIP delay set value (ATIP delay) in accordance with the delay of the time of outputting the biphase data in the FM demodulating circuit and the delay of the time of detecting the ATIP synchronization signal in the ATIP decoder, it is possible to adjust the phase used when the initialization of the EFM outputting timing is performed.

Thereby, it is possible that the position of each of the subcode frame synchronization signals on the disk 1 is approximately coincident with the end of a respective one of the ATIP synchronization signals SYNC actually recorded on the disk 1.

Thus, it is possible to prevent position displacement between each of the positions of the ATIP synchronization signals included in the pregrooves of the CD-R/RW and a respective one of the positions of the subcode frame synchronization signals included in information later recorded.

A second embodiment of the present invention will now be described.

Figure 10:
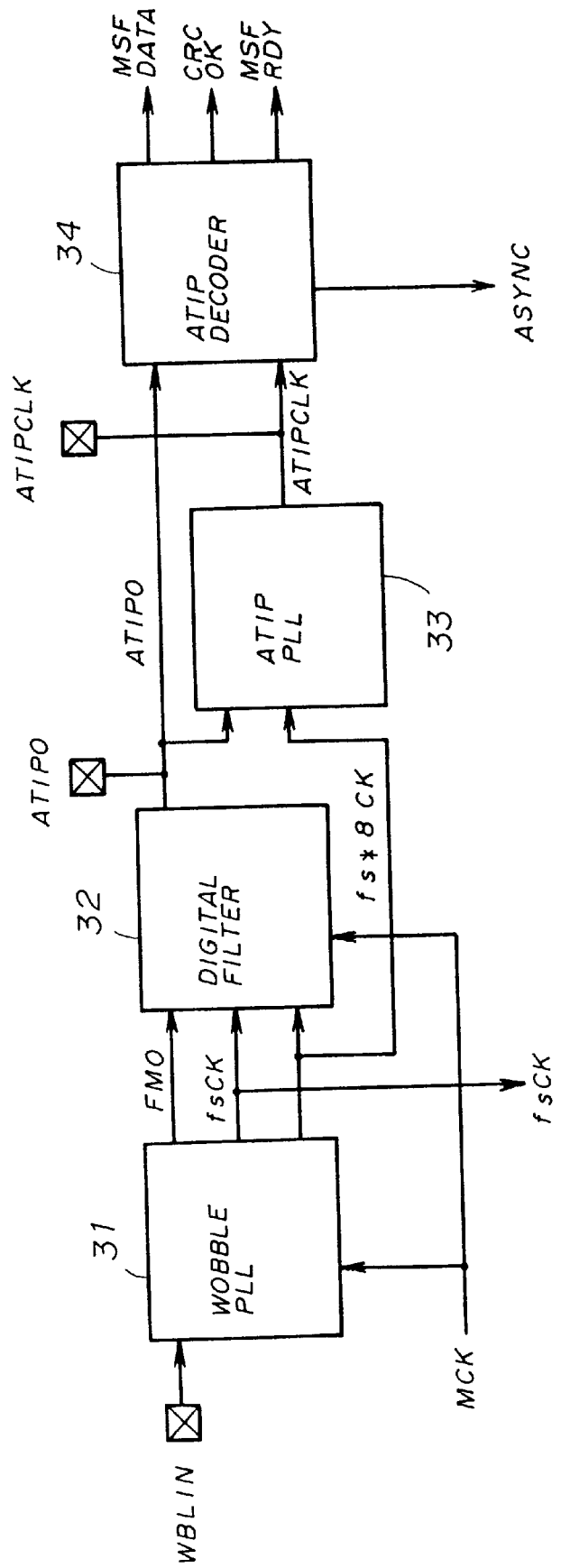
FIG. 10 shows a general functional block diagram of an example of an ATIP decoder, shown in FIG. 6, in a second embodiment of the present invention.

In the second embodiment, the ATIP decoder 6 shown in FIG. 6 includes the arrangement shown in FIG. 10, and it is not necessary that the CD encoder 7 shown in FIG. 6 includes the arrangement shown in FIG. 7.

In the second embodiment, when the center frequency of the wobble signal varies, the cut-off frequency of a digital filter 32 is changed in proportion to the variation of the center frequency of the wobble signal, as a result of performing sampling in the digital filter 32 using a first multiplied clock signal.

In FIG. 10, a wobble PLL 31, the digital filter 32, an ATIP-PLL 33 and an ATIP decoder 34 are shown. FMO is a FM-demodulated signal, MCK is a master clock signal, fsCK is the first multiplied clock signal, fs*8CK is a second multiplied clock signal, ATIPO is the biphase data, ATIP-CLK is the biphase clock signal, and MSF data is the ATIP (MSF) data.

The wobble PLL 31 comprises a digital PLL which is arranged so that the phase of the output clock signal is locked to the phase of the input wobble signal WBLIN. The wobble PLL 31 demodulates the FM-modulated component included in the wobble signal, and outputs the FM-demodulated signal FMO. Such a digital filter has been known conventionally, as described above as the first prior art.

The wobble PLL 31 also outputs the first multiplied clock signal fsCK and the second multiplied clock signal fs*8CK.

The frequency of the first multiplied clock signal is double the center frequency of the wobble signal (22.05 kHz), that is, 44.1 kHz.

On the other hand, the frequency of the second multiplied clock signal is eight times the frequency of the first multiplied clock signal, that is, 352.8 kHz.

It is known that the FM-demodulated signal FMO is obtained as the comparator output of the wobble PLL 31 (which comprises the digital PLL), and the multiplied clock signals are obtained as the clock signals input to fixed-dividing-ratio dividers which are inserted in the loop of the wobble PLL 31 (which comprises the digital PLL).

Because the wobble PLL 31 operates in a condition in which the operation is locked to the phase of the input wobble signal, when the center frequency of the wobble signal varies, the center frequencies of the first multiplied clock signal fsCK and the second multiplied clock signal fs*CK output from the wobble PLL 31 vary, respectively, in proportion to the variation of the center frequency of the wobble signal.

The digital filter 32 performs sampling on the FM-demodulated signal FMO and removes the high-frequency noise from the FM-demodulated signal. As the digital filter 32, the FIR (Finite Impulse Response) filter, described above as the second prior art, is known. The FM-demodulated signal, from which the noise has been removed, is converted into a binary signal and is output as the biphase data ATIPO.

The sampling in the digital filter 32 is performed with the first multiplied clock signal. Thereby, when the center frequency of the wobble signal varies, the cut-off frequency of the digital filter 32 varies in proportion to the variation of the center frequency of the wobble signal.

As a result, when the center frequency of the wobble signal varies due to variation of speed of disk rotation and/or eccentricity, the cut-off frequency of the digital filter is always adjusted to the optimum frequency.

The biphase data ATIPO is input to the ATIP-PLL 33 which then outputs the biphase clock ATIPCLK, the phase of which is locked to the phase of the input biphase data. Also the ATIP-PLL 33 comprises a digital PLL. The ATIP-PLL 33 uses the second multiplied clock signal fs*8CK as the operating clock signal.

Thereby, when the center frequency of the wobble signal varies, the free-running frequency of the ATIP-PLL 33 varies in proportion to the variation of the center frequency of the wobble signal.

As a result, when the center frequency of the wobble signal varies due to variation of speed of disk rotation and/or eccentricity, it is possible that the biphase clock signal ATIPCLK having a small stationary phase difference with respect to the biphase data can be generated.

The biphase data ATIPO and biphase clock signal ATIP-CLK are input to the ATIP decoder 34, which, similar to the ATIP decoder (ATIP detector) in the related art, detects the time information of the ATIP and ATIP synchronization signal.

When detecting the ATIP synchronization signal, the ATIP decoder 34 outputs the ATIP synchronization detection signal ASYNC.

Thus, in the second embodiment, the digital filter 32 performs sampling using the first multiplied clock signal. Thereby, when the center frequency of the wobble signal varies, the cut-off frequency of the digital filter 32 varies in proportion to the variation of the center frequency of the wobble signal.

As a result, when the center frequency of the wobble signal varies due to variation of speed of disk rotation and/or eccentricity, the cut-off frequency of the digital filter is always adjusted to the optimum frequency.

The ATIP-PLL 33 uses the second multiplied clock signal fs*8CK as the operating clock signal. Thereby, when the center frequency of the wobble signal varies, the free-running frequency of the ATIP-PLL 33 varies in proportion to the variation of the center frequency of the wobble signal.

As a result, when the center frequency of the wobble signal varies due to variation of speed of disk rotation and/or eccentricity, it is possible that the biphase clock signal ATIPCLK having a small stationary phase difference with respect to the biphase data can be generated.

When the second embodiment is combined with the above-described first embodiment, that is, the CD encoder 7 shown in FIG. 6 includes the arrangement shown in FIG. 7, and also, the ATIP decoder 6 shown in FIG. 6 includes the arrangement shown in FIG. 10, in addition to the advantages obtained in the first embodiment, occurrences of ATIP decode error can be reduced. Thus, the reliability of the ATIP time information is improved.

It is also possible that only the CD encoder 7 includes the arrangement shown in FIG. 7 but the ATIP decoder 6 does not include the arrangement shown in FIG. 10.

It is also possible that only the ATIP decoder 6 includes the arrangement shown in FIG. 10 but the CD encoder 7 does not include the arrangement shown in FIG. 7.

Further, the present invention is not limited to the above-described embodiments, and variations and modifications may be made without departing from the scope of the present invention.

What is claimed is:

1. A recording timing control circuit of an optical disk driving device, comprising:

pregroove information detecting means for detecting an ATIP synchronization signal from an input wobble signal recorded on an optical disk as a wobble of pregrooves formed on the optical disk; and encoding means for modulating information to be recorded, inserting a subcode frame synchronization signal into the information to be recorded at a predetermined position, and outputting a pattern to be recorded, and wherein said encoding means comprises information outputting timing control means for controlling a timing at which the information to be recorded is output; and wherein said information outputting timing control means performs information recording timing initialization to initialize the phase between a timing at which the ATIP synchronization signal is detected from the disk and a timing at which the subcode frame synchronization signal is recorded on the optical disk, and wherein said initialization is performed before the information to be recorded is actually recorded on the optical disk, and wherein said recording timing control circuit is arranged such that the phase between the timing at which the ATIP synchronization signal is detected and the timing at which the subcode frame synchronization signal is recorded is adjustable.

2. A recording timing control circuit of an optical disk driving device, comprising:

pregroove information detecting means for detecting a first synchronization signal from an input wobble signal recorded on an optical disk as a wobble of pregrooves formed on the optical disk; and encoding means for modulating information to be recorded, inserting a second synchronization signal into the information to be recorded at a predetermined position, and outputting a pattern to be recorded, wherein:

said encoding means comprises information outputting timing control means for controlling a timing at which the information to be recorded is output; and said information outputting timing control means performs information recording timing initialization, before the information to be recorded is actually recorded on the optical disk, in which initialization the phase between a timing at which the first synchronization signal is detected from the disk and a timing at which the second synchronization signal is recorded on the optical disk is adjustable; and wherein said pregroove information detecting means comprises:

a first digital PLL circuit which causes the phase of an operating clock signal to be locked to the phase of the wobble signal, and outputs a demodulated signal of the frequency component of the wobble signal and a clock signal having a frequency obtained from multiplying the frequency of the wobble signal;

a digital filter which operates using the multiplied clock signal output from said first digital PLL circuit as a sampling clock, and removes a high-frequency noise component from the demodulated signal output from said first digital PLL circuit;

a second digital PLL circuit which uses the multiplied clock signal output from said first digital PLL circuit as an operating clock signal and outputs a demodulated clock signal, the phase of which is locked to the phase of the demodulated signal output from said first digital PLL; and a synchronization detecting circuit which operates using the demodulated clock signal output from said second digital PLL circuit as a sampling clock signal, and detects a synchronization signal of the wobble signal from the signal output from said digital filter.

3. A recording timing control circuit of an optical disk driving device, comprising:

an ATIP decoder which detects an ATIP synchronization signal from a wobble signal recorded on an optical disk as a wobble of pregrooves formed on the optical disk; and a CD encoder which performs EFM modulation on information to be recorded, inserts a subcode frame synchronization signal into the information to be recorded at a predetermined position, and outputs an EFM pattern to be recoded, wherein:

said CD encoder comprises an EFM outputting timing control circuit which controls a timing at which the EFM pattern is output; and said EFM outputting timing control circuit performs information recording timing initialization, before the EFM pattern is actually recorded on the optical disk, in which initialization the phase between a timing at which the ATIP synchronization signal is detected from the optical disk and a timing at which the subcode frame synchronization signal is recorded on the optical disk is adjustable.

4. A recording timing control circuit of an optical disk driving device, comprising:

pregroove information detecting means for detecting a first synchronization signal from pregroove information recorded on an optical disk as a wobble of pregrooves formed on the optical disk; and encoding means for modulating information to be recorded, inserting a second synchronization signal into the information to be recorded at a predetermined position, and outputting a pattern to be recoded, wherein said pregroove information detecting means comprises:

a first digital PLL circuit which causes a phase of an operating clock signal to be locked to the phase of the wobble signal, and outputs a demodulated signal of the frequency component of the wobble signal and a clock signal having a frequency obtained from multiplying the frequency of the wobble signal;

a digital filter which operates using the multiplied clock signal output from said first digital PLL circuit as a sampling clock, and removes a high-frequency noise component from the demodulated signal output from said first digital PLL circuit;

a second digital PLL circuit which uses the multiplied clock signal output from said first digital PLL circuit as an operating clock signal and outputs a demodulated clock signal, the phase of which is locked to the phase of the demodulated signal output from said digital filter; and a synchronization detecting circuit which operates using the demodulated clock signal output from said second digital PLL circuit as a sampling clock signal, and detecting a synchronization signal of the wobble signal from the signal output from said digital filter.

5. A recording timing control circuit of an optical disk driving device, comprising:

an ATIP decoder which detects an ATIP synchronization signal from a wobble signal recorded on an optical disk as a wobble of pregrooves formed on the optical disk; and a CD encoder which performs EFM modulation on information to be recorded, inserts a subcode frame synchronization signal into the information to be recorded at a predetermined position, and outputs an EFM pattern to be recoded, wherein said ATIP decoder comprises:

a wobble PLL which causes the phase of an operating clock signal to be locked to a phase of the wobble signal, demodulates the FM modulated component included in the wobble signal and outputs the demodulated signal, a first clock signal having a frequency obtained from multiplying the frequency of the wobble signal by a first multiplication factor and a second clock signal having a frequency obtained from multiplying the frequency of the wobble signal by a second multiplication factor;

a digital filter which operates using the first multiplied clock signal output from said first digital PLL circuit as a sampling clock, performs sampling on the demodulated signal output from said wobble digital PLL circuit, removes a high-frequency noise component from the demodulated signal, converts the thus-obtained signal into a binary signal, and outputs the binary signal as biphase data;

an ATIP PLL which uses the second multiplied clock signal output from said first digital PLL circuit as an operating clock signal and outputs a biphase clock signal, the phase of which is locked to the phase of the biphase data output from said digital filter; and an ATIP decoder which operates using the biphase clock signal output from said ATIP PLL as a sampling clock signal, and detects the time information of an ATIP and an ATIP synchronization signal of the wobble signal from said biphase data output from said digital filter.

* * * * *